(12) United States Patent
Bayareddy et al.

(10) Patent No.: US 8,233,385 B1
(45) Date of Patent: Jul. 31, 2012

(54) PREVENTING UPPER LAYER RENEGOTIATIONS BY MAKING PPP AWARE OF LAYER ONE SWITCHOVERS

(75) Inventors: Srinath Bayareddy, San Jose, CA (US); Sunil Bakhru, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 124 days.

(21) Appl. No.: 12/389,424

(22) Filed: Feb. 20, 2009

(51) Int. Cl.
*H04L 12/26* (2006.01)

(52) U.S. Cl. ........................ 370/225; 370/310.1; 370/389

(58) Field of Classification Search .................. 370/225, 370/310.1, 346, 389, 395, 397, 399, 466, 370/467, 469; 714/31
See application file for complete search history.

(56) References Cited

U.S. PATENT DOCUMENTS

| | | | | |
|---|---|---|---|---|
| 6,028,861 | A * | 2/2000 | Soirinsuo et al. | 370/225 |
| 6,628,671 | B1 * | 9/2003 | Dynarski et al. | 370/469 |
| 6,694,455 | B1 * | 2/2004 | Scrandis et al. | 714/31 |
| 6,714,801 | B1 * | 3/2004 | Sugaya | 370/310.1 |
| 2002/0097683 | A1 * | 7/2002 | Yamamoto et al. | 370/242 |

OTHER PUBLICATIONS

W. Simpson, "The Point-to-Point Protocol (PPP)", Network Working Group, Request for Comments: 1661, Jule 1994, see subsections 4.1. "State Transition Table", and 4.2. "States".*
Andrew S. Tanenbaum, "Computer Networks", Third Edition, ISBN 0-13-34995-6, Copyright 1996 by Prentice Hall PTR, pp. 231-233, for an introduction/description of "PPP—Point-to-Point Protocol".*
Troubleshooting "Line Protocol is Down" Problems on POS Interfaces, Document ID 16152, 2008-2009 Cisco Systems, Inc., May 19, 2006, 14 pages.
W. Simpson (Ed), Network Working Group, RFC 1661, The Point-to-Point Protocol (PPP), Jul. 1994, pp. i-ii and 1-52.
W. Simpson, Network Working Group, Applicability Statement for PPP over Sonet/SDH draft-ietf-pppext-sonet-as-00.txt, Aug. 1998, pp. i and 1-21.

* cited by examiner

*Primary Examiner* — Andrew Lai

(74) *Attorney, Agent, or Firm* — Harrity & Harrity, LLP

(57) ABSTRACT

A method may include establishing a first Point-to-Point Protocol (PPP) session on an interface, receiving an indication of a layer one failure, omitting for a period of time, an indication that the first PPP session on the interface is down, based on the indication of the layer one failure, establishing a layer one switchover to another interface based on the indication of the layer one failure, and attempting during the period of time, to establish a second PPP session on the other interface.

20 Claims, 5 Drawing Sheets

PREVENTING UPPER LAYER RENEGOTIATIONS BY MAKING PPP AWARE OF LAYER ONE SWITCHOVERS

BACKGROUND

The Point-to-Point Protocol (PPP), defined in Request For Comments (RFC) 1661 (hereinafter referred to as the "PPP specification"), provides a standard method for transporting multi-protocol data units over point-to-point links. PPP includes three main components, namely, a method for encapsulation, a Link Control Protocol (LCP) for establishing, configuring, and testing different network-layer protocols, and a number of Network Control Protocols (NCP) for establishing and configuring different network layer protocols. The PPP includes mechanisms for renegotiations when a lower layer failure occurs.

SUMMARY

According to one implementation, a method performed by a device and may include establishing, by the device, a first Point-to-Point Protocol (PPP) session on an interface, receiving, by the device, an indication of a layer one failure, omitting, by the device, for a period of time, an indication that the first PPP session on the interface is down, based on the indication of the layer one failure, establishing, by the device, a layer one switchover to another interface based on the indication of the layer one failure, and attempting, by the device, during the period of time, to establish a second PPP session on the other interface.

According to another implementation, a device may include a first communication interface to establish a Point-to-Point Protocol session, identify a layer one failure, delay, for a period of time, to indicate that the PPP session is down, perform a switchover to a second communication interface, and the second communication interface to attempt to establish, during the period of time, another PPP session.

According to still another implementation, a computer-readable medium may store executable instructions, that when executed, cause a processor to establish a Point-to-Point Protocol (PPP) session on a communication interface, provide an indication when a layer one failure occurs on the communication interface, perform a switchover, which includes establishing another layer one session on another communication interface, when the indication is provided, omit, for a period of time, an indication that the PPP session is down, and attempt to establish, during the period of time, another PPP session on the other communication interface.

According to another implementation, a device may include means for establishing a layer one session, means for establishing a Point-to-Point Protocol session with respect to the layer one session, means for determining when the layer one session goes down, means for performing a switchover to establish another layer one session when it is determined that the layer one session has gone down, means for delaying, for a period of time, a marking down of the PPP session, means for attempting to establish, during the period of time, another PPP session with respect to the other layer one session, and means for marking the PPP session down when the other PPP session is not established before the period of time expires.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention. Rather, the scope of the invention is defined by the appended claims and equivalents.

The term "data unit," as used herein, may refer to a packet, a datagram, or a cell; a fragment of a packet, a datagram, or a cell; or another type or arrangement of data.

As described herein, a network device, utilizing the PPP, may prevent layer three protocols and above from performing renegotiations during a layer one switchover. The PPP is considered a layer two protocol, which includes the LCP and the NCP. In one embodiment, the network device may include working interfaces and protect interfaces as a form of redundancy. Additionally, the network interface may include a pseudo-interface. The working interfaces and the protect interfaces may host layer one and the LCP. The pseudo-interface may host the NCP and upper layers (i.e., layer three protocols and above).

Based on this configuration (i.e., by splitting up the LCP and the NCP), the network device may recognize when a working interface goes down, that this failure relates to a layer one switchover (e.g., an automatic protection switching (APS) event). In such instances, the network device may not immediately mark down layer two (the PPP layer) in reaction to a layer one switchover, which is typically the case according to the PPP specification. Rather, the network device may provide a period of time for the LCP layer and the NCP layer to renegotiate a session. If the PPP layer is successful in renegotiating a session on a protect interface, before the period of time expires, the upper layers are not disturbed by the switchover. On the other hand, if the PPP layer is not successful in renegotiating a session before the period of time expires, the network device may mark the PPP layer as down. In such an instance, subsequent states of the network device may follow in accordance with the PPP specification.

As a result of the foregoing, by delaying the marking down of the PPP layer, the upper layers are insulated from a layer one switchover, so that renegotiations and convergence delay (e.g., the re-building of network topology information, routing information, etc.) may be avoided, as well as other advantages that necessarily flow therefrom.

Exemplary Network

Figure 1:
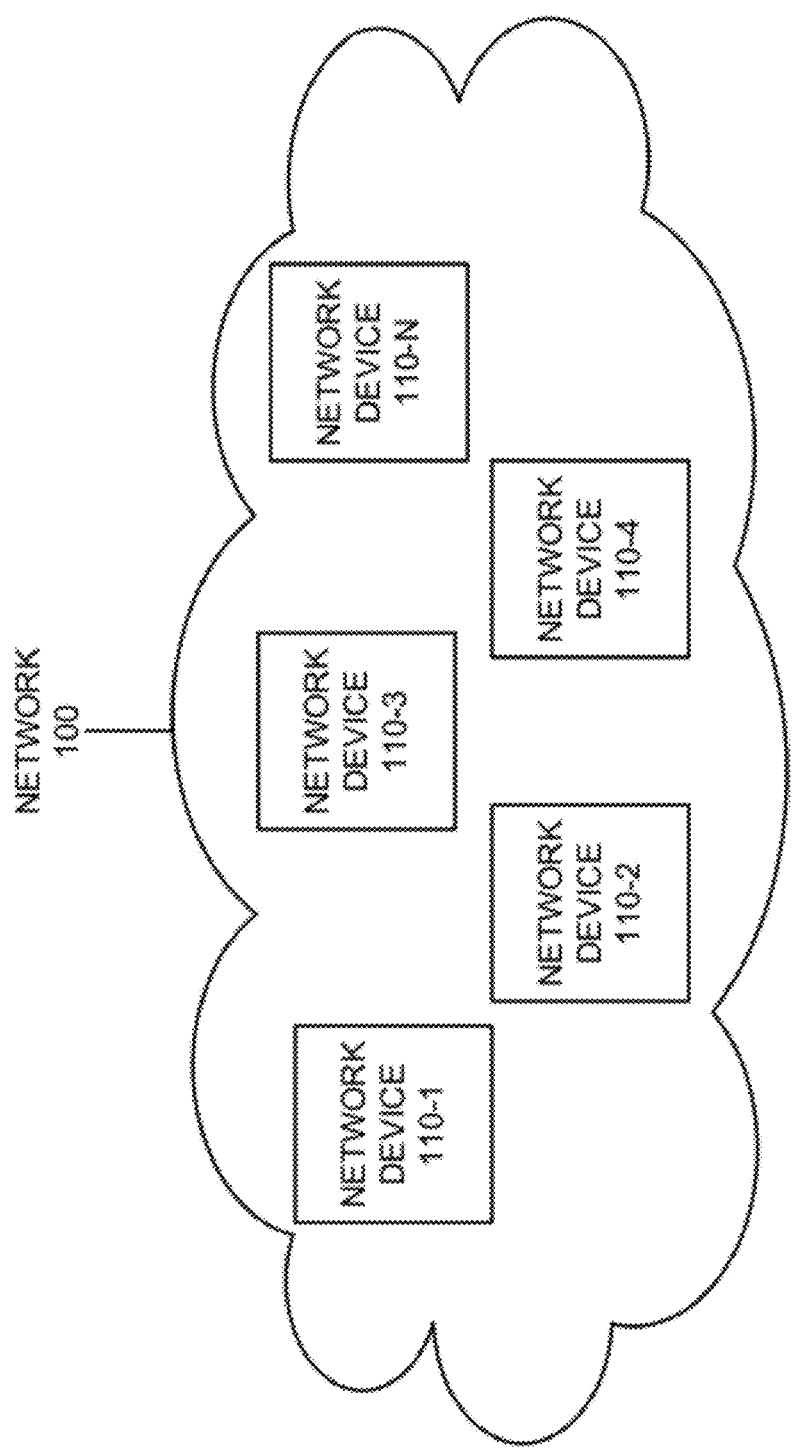
FIG. 1 is a diagram of an exemplary network in which methods, devices, and systems, described herein, may be implemented.

FIG. 1 is a diagram of an exemplary network 100 in which methods, devices, and systems, described herein, may be implemented. Network 100 may include one or multiple networks of any type. By way of example, network 100 may include a private network, a public network, the Internet, an ad hoc network, a local area network (LAN), a wide area network (WAN), a metropolitan area network (MAN), and/or a telephone network (e.g., a wireless communication network or the public switched telephone network (PSTN)).

As shown, network 100 may include N network devices 110-1 through 110-N (collectively referred to herein as "network devices 110," or generically as "network device 110") (N≧1). Network device 110 may include a switch, a router, a server, or another type of device. While network device 110 can be implemented as different types of devices, in the following paragraphs, network device 110 will be described in terms of a router. The links interconnecting network devices 110 may be wireless and/or wired. Additionally, the interconnections between network devices 110 may include redundancy.

Figure 2:
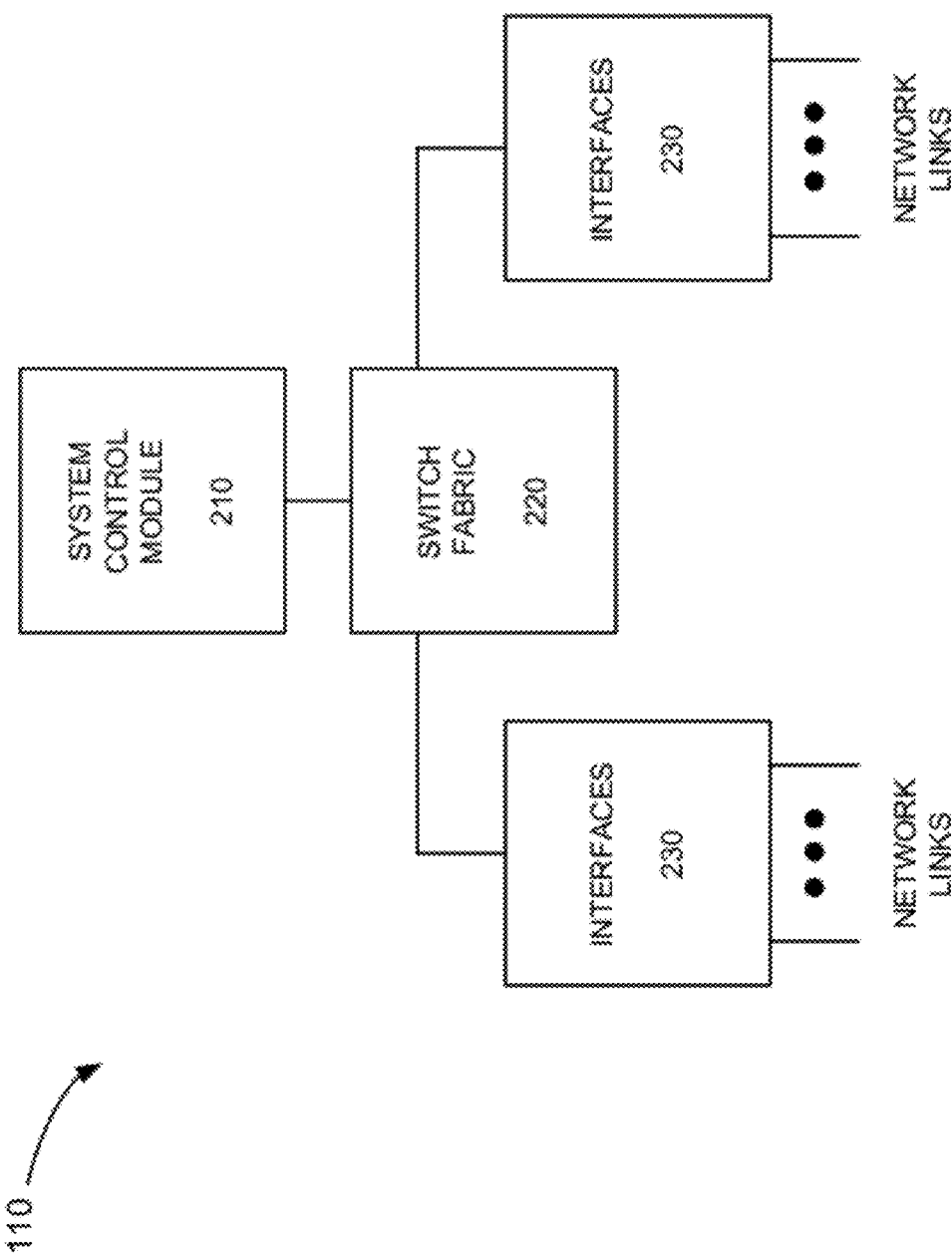
FIG. 2 is a block diagram illustrating exemplary components of a network device of FIG. 1.

FIG. 2 is a diagram illustrating exemplary components of network device 110. As illustrated in FIG. 2, network device 110 may include a system control module 210, a switch fabric 220, and a group of interfaces 230. In other implementations, network device 110 may include fewer, additional, different, or differently arranged components than those illustrated in FIG. 2.

System control module 210 may include one or multiple processors, microprocessors, application specific integrated circuits (ASICs), field programming gate arrays (FPGAs), and/or processing logic that may be optimized for networking and communications. System control module 210 may perform high level management functions for network device 110. For example, system control module 210 may communicate with other networks, devices, and/or systems connected to network device 110 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or multiple switching planes to facilitate communication among interfaces 230 and/or system control module 210. In one implementation, each of the switching planes may include a single-stage switch or a multi-stage switch of crossbar elements. Switch fabric 220 may also, or alternatively, include processors, memories, and/or paths that permit communication among system control module 210 and interfaces 230.

Interfaces 230 may include devices or assemblies, such as line cards, for receiving incoming data units from network links (or from other interfaces 230) and for transmitting the data units to network links (or to other interfaces 230). For example, interfaces 230 may include wireless and/or wireless interfaces, such as, Ethernet interfaces, optical carrier (OC) interfaces, and/or asynchronous transfer mode (ATM) interfaces. Interfaces 230 may manage a set of input ports via which data units can be received and a set of output ports via which data units can be transmitted. Interfaces 230 may include memory, one or more processors, and/or other logic.

Depending on the implementation, the components that are illustrated in FIG. 2 may provide fewer or additional functionalities. For example, if network device 110 performs an Internet Protocol (IP) data unit routing function as part of a Multi-Protocol Label Switching (MPLS) router, system control module 210 may perform tasks associated with obtaining routing information from other routers in a MPLS network. In such cases, conveying network traffic from one interface to another may involve label-based routing, rather than IP address-based routing.

Figure 3:
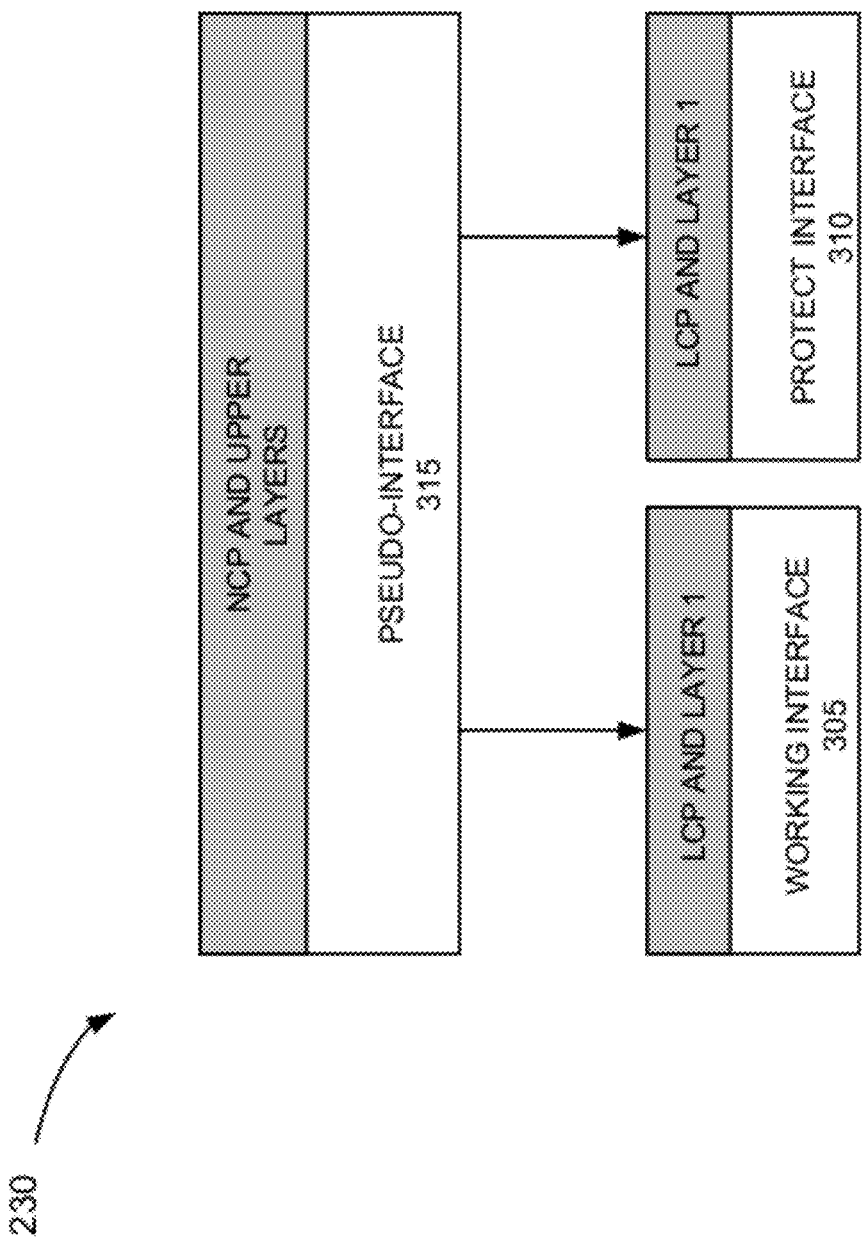
FIG. 3 is a block diagram illustrating exemplary functional components of an interface of FIG. 2.

FIG. 3 is a block diagram illustrating exemplary components of interface 230. As shown, interface 230 may include a pseudo-interface 315, a working interface 305, and a protect interface 310. In different implementations, interface 230 may include fewer, additional, different, or differently arranged components than those illustrated in FIG. 3. Working interface 305, protect interface 310, and pseudo-interface 315 may be implemented in hardware, or a combination of software and hardware.

Working interface 305 may provide layer one functionality and LCP functionality associated with the PPP specification. Protect interface 310 may provide layer one functionality and LCP functionality associated with the PPP specification. Working interface 305 and protect interface 310 may provide a form of redundancy. For example, when working interface 305 suffers from a failure, network device 110 may utilize protect interface 310 as a back-up interface.

Pseudo-interface 315 may provide NCP functionality associated with the PPP specification and upper layer functionality (e.g., layer three functionality and above). In such a configuration, LCP functionality and NCP functionality associated with the PPP specification are split up between interfaces.

Exemplary Process

Figure 4:
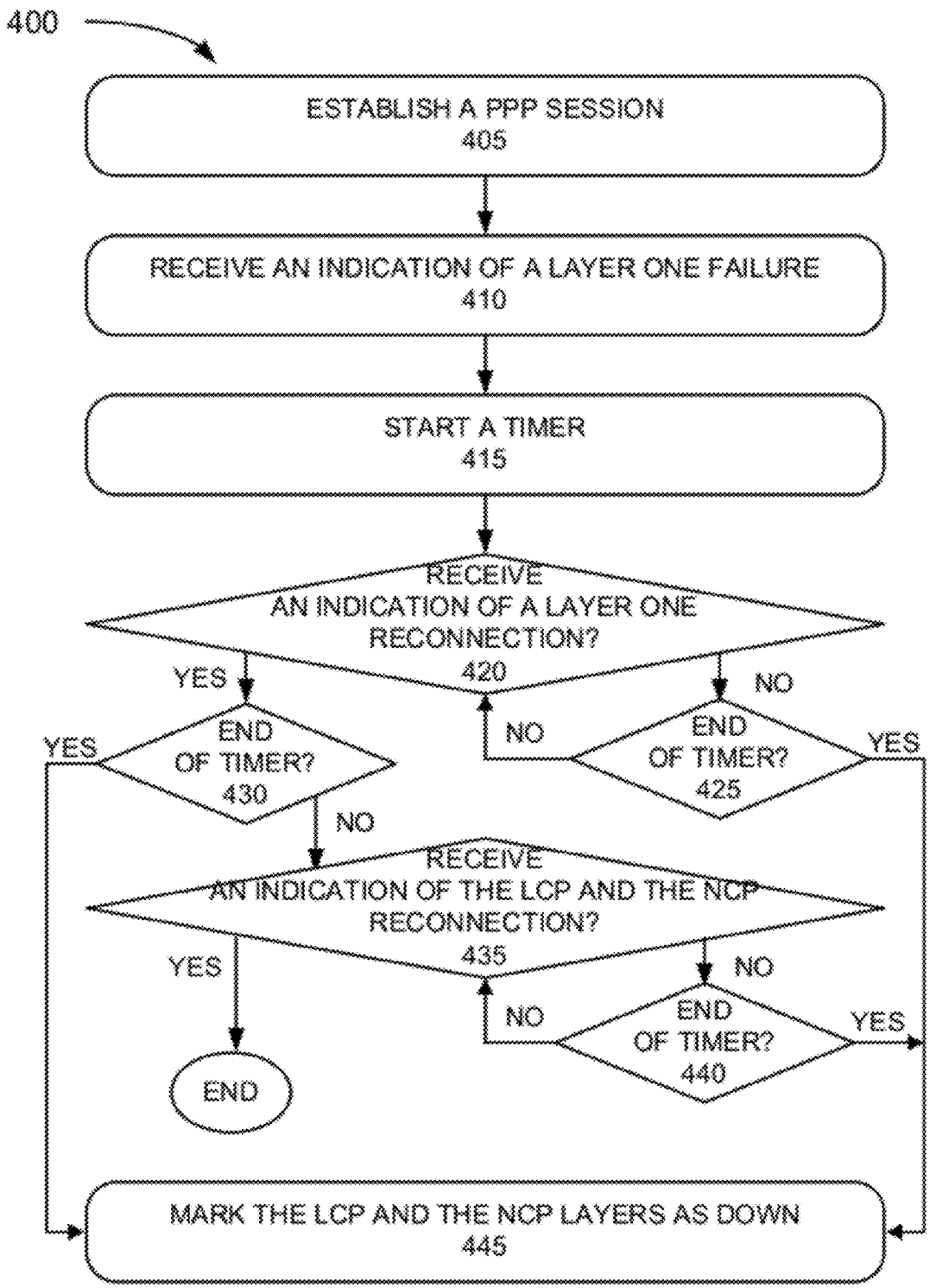
FIG. 4 illustrates a flowchart of an exemplary process for preventing upper layer renegotiations when a layer one switchover occurs.
Figure 5:
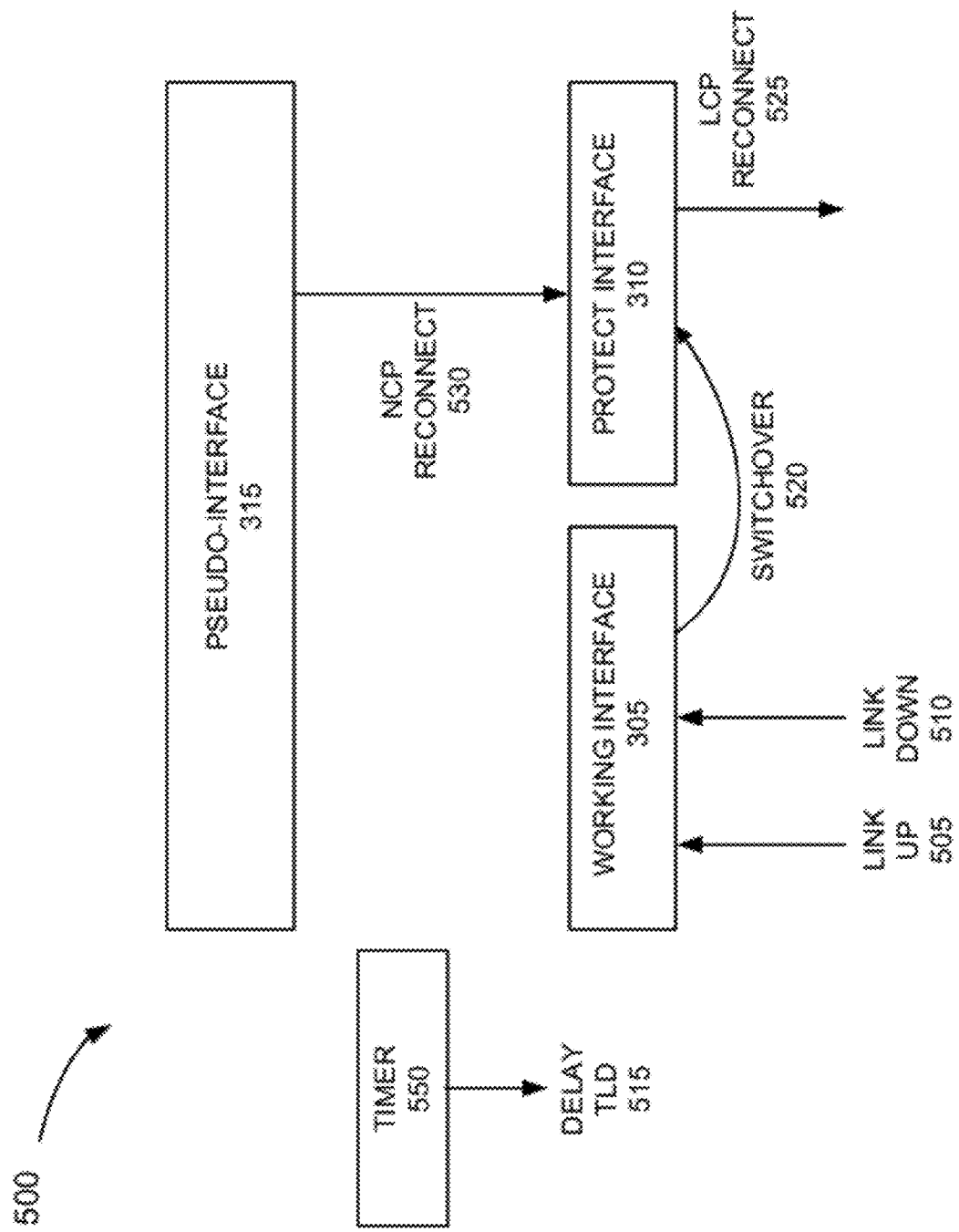
FIG. 5 is a diagram illustrating an exemplary scenario consistent with an exemplary implementation of the process depicted in FIG. 4.

FIG. 4 illustrates a flowchart of an exemplary process for preventing upper layer renegotiations when a layer one switchover occurs. Process 400 may be performed by interface 230 and/or another component separate from or in conjunction with interface 230. FIG. 5 is a diagram illustrating an exemplary scenario consistent with an exemplary implementation of process 400.

Process 400 may begin with establishment of a PPP session (block 405). For example, network device 110 may establish a connection with another device on interface 230 (e.g., on working interface 305), as illustrated in FIG. 5 (link up 505). As provided in the PPP specification, a PPP link may be in an OPEN state once a PPP session is established.

Returning to FIG. 4, an indication of a layer one failure may be received (block 410). For example, the connection with the other device on interface 230 may fail, as illustrated in FIG. 5 (link down 510). Subsequently, as described in the PPP specification, while in the OPEN state (i.e., state 9), the PPP layer may receive a This-Layer-Down (TLD)/1 event, which notifies the PPP layer of the layer one failure (i.e., that layer one has gone down) on working interface 305.

Returning to FIG. 4, a timer may be started (block 415). Network device 110 (e.g., interface 230) may start a timer 550 once the This-Layer-Down (TLD)/1 event is received, as illustrated in FIG. 5 (delay TLD 515). The timer may be user-configurable. The timer may provide a period of time for the LCP and the NCP to establish a new session (e.g., a reconnection on protect interface 310). The PPP layer may enter a START state (i.e., state 1), as defined in the PPP specification. This is in contrast to the PPP specification in which the PPP layer would go into a TLD state.

Returning to FIG. 4, it may be determined whether an indication of a layer one reconnection is received (block 420). Network device 110 (e.g., interface 230) may attempt a switchover 520 to protect interface 310, as illustrated in FIG. 5. If it is determined that a layer one connection has not been established (block 420—NO), it may be determined whether the timer has expired (block 425). If the timer has not expired (block 425—NO), interface 230 may continue to wait for switchover 520 to successfully occur. On the other hand, if it is determined that the timer has expired (block 425—YES), then process 400 may proceed to block 445, as described below.

Alternatively, if it is determined that a layer one connection has been established (block 420—YES), it may be determined whether the timer has expired (block 430). If the timer has not expired (block 430—NO), then process 400 may continue to block 435, as described below. On the other hand, if it is determined that the timer has expired (block 430—YES), then process 400 may proceed to block 445, as described below.

It may be determined whether an indication of the LCP and the NCP reconnection is received (block 435). As illustrated in FIG. 5, once switchover 520 is known to be successful, a LCP reconnect 525 and a NCP reconnect 530 may be attempted. In practice, NCP reconnect 530 may not occur until after the LCP layer successfully reconnects (i.e., is in an OPEN state).

If it is determined that LCP and NCP connections have not been established (block 435—NO), it may be determined whether the timer has expired (block 440). If the timer has not expired (block 440—NO), interface 230 may continue to wait for LCP and NCP connections to successfully occur. On the other hand, if it is determined that the timer has expired (block 440—YES), then process 400 may proceed to block 445, as described below.

Alternatively, if it is determined that LCP and NCP connections have been established (block 435—YES), then process 400 may end. For example, the timer may be cancelled. In this case, the upper layers (e.g., layer 3 and above) are insulated from the layer one switchover and do not need to renegotiate sessions.

If the timer has expired (block 425—YES, block 430—YES, or block 440—YES), the LCP and the NCP layers may be marked as down (block 445). Interface 230 may mark the LCP and the NCP layers as down, in accordance with the PPP specification. Layer three and upper layers may correspondingly be marked as down until reconnections on the lower layers are reestablished.

Although FIG. 4 illustrates an exemplary process 400, in other implementations, process 400 may include additional, fewer, or different operations than those described.

CONCLUSION

Implementations, described herein, may provide a PPP interface that is aware of layer one switchovers and reduces renegotiations, delays, etc., from occurring.

The foregoing description provides illustration and description, but is not intended to be exhaustive or to limit the invention to the precise form disclosed. Modifications and variations are possible in light of the above teachings or may be acquired from practice of the invention. For example, other protocol specifications may perform unnecessary renegotiations when a layer one switchover occurs. Thus, it will be appreciated that the concepts described herein may have application to protocols, other than the PPP.

While a series of blocks has been described with regard to FIG. 4, the order of the blocks may be modified in other implementations. Further, non-dependent blocks may be performed in parallel.

Also, certain portions of the implementations have been described as "logic" or a "component" that performs one or more functions. The term "logic" or "component" may include hardware, such as a processor, an ASIC, or a FPGA, or a combination of hardware and software (e.g., software running on a processor). The term "computer-readable medium" may include a memory, a secondary storage device, a compact disc (CD), a digital versatile disc (DVD), or some other type of medium capable of storing data and/or instructions. The computer-readable medium may be implemented in a single device, in multiple devices, in a centralized manner, or in a distributed manner.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The term "and/or" is intended to be interpreted to include any and all combinations of one or more of the associated list items.

What is claimed:

1. A method performed by a device, the method comprising:
    establishing, by the device, a first Point-to-Point Protocol (PPP) session on a first interface, the first interface including a component to receive data, from a network, during the first PPP session, and establishing the first PPP session including establishing a first link control protocol (LCP) session and a network control protocol (NCP) session on the first interface;
    receiving, by the device, an indication of a layer one failure on the first interface, the layer one failure relating to a malfunction of the component; and
    attempting, by the device and for a period of time, to establish, based on the indication of the layer one failure on the first interface, a second PPP session, the attempting to establish the second PPP session including:
        attempting to establish, during the period of time and based on the indication of the layer one failure on the first interface, a layer one switchover to a second interface, that differs from the first interface, and
        attempting, during the period of time and in response to establishing the layer one switchover to the second interface, to establish the second PPP session on the second interface,
        the attempting to establish the second PPP session on the second interface including:

attempting, during the period of time, to establish a second LCP session on the second interface, the second LCP session being different from the first LCP session; and when the second LCP session has been established on the second interface, attempting, during the period of time and based on the second LCP session, to move the NCP session from the first interface to the second interface.

2. The method of claim 1, further comprising:
starting, by the device, a timer to define the period of time.

3. The method of claim 1, further comprising:
determining, by the device, whether the period of time expires before the second PPP session on the second interface is established; and
indicating, by the device, that the first PPP session is down on the first interface, when the period of time has expired before the second PPP session on the second interface is established.

4. The method of claim 1, further comprising:
establishing, by the device, the second PPP session before the period of time expires; and
omitting, by the device and in response to establishing the second PPP session before the period of time expires, to indicate to a layer three session, a state of the first PPP session.

5. The method of claim 1, further comprising:
entering, by the device and during the time period, a start state corresponding to a state 1 defined in a PPP specification.

6. The method of claim 1, where receiving the indication of the layer one failure includes:
receiving, by the device, a This-Layer-Down (TLD)/1 event, where the TLD/1 event corresponds to the indication of the layer one failure.

7. The method of claim 1, further comprising:
determining, by the device, that the period of time expires before the second PPP session on the second interface is established; and
indicating, by the device, that a layer three session is down on the first interface, when the period of time has expired before the second PPP session on the second interface is established.

8. A device, comprising:
a first communication interface including a component to receive data from a network, where the first communication interface is to:
establish a Point-to-Point Protocol (PPP) session on the first communication interface, the PPP session being associated with a first link control protocol (LCP) session and a network control protocol (NCP) session,
identify a layer one failure in the first communication interface, the layer one failure relating to a malfunction of the component,
delay, for a period of time and in response to identifying the layer one failure in the first communication interface, indicating sending an indication that the PPP session is down,
perform, during the period of time and in response to identifying the layer one failure in the first communication interface, a switchover to a second communication interface; and
the second communication interface to:
attempt to establish, during the period of time and in response to performing, by the first communication interface, the switchover to the second communication interface, another PPP session on the second communication interface,
the second communication interface, when attempting to establish the other PPP session on the second communication interface, being further to:
attempt, during the period of time, to establish a second LCP session on the second communication interface, the second LCP session being different from the first LCP session; and
when the second LCP session has been established on the second communication interface, attempt, during the period of time and based on the second LCP session, to move the NCP session from the first communication interface to the second communication interface.

9. The device of claim 8, further comprising:
a pseudo-interface that hosts the NCP session, where the first communication interface corresponds to a working interface and the second communication interface corresponds to a protect interface, and where the pseudo-interface differs from the working interface and the protect interface.

10. The device of claim 8, where the first communication interface is further to:
omit sending an indication that a layer three session is down on the first communication interface when the other PPP session is established before the period of time expires.

11. The device of claim 8, where, when delaying sending the indication that the PPP session is down, the first communication interface is further to:
enter a start state corresponding to a state 1 defined in a PPP specification associated with the PPP session.

12. The device of claim 8, where, when performing the switchover, the second communication interface is further to:
attempt to establish a layer one session.

13. The device of claim 8, where the device corresponds to a router.

14. A non-transitory computer-readable medium comprising:
one or more instructions which, when executed by a processor, cause the processor to establish a Point-to-Point Protocol (PPP) session on a communication interface, the communication interface including a component to receive data, from a network, during the PPP session, and the PPP session being associated with a first link control protocol (LCP) session and a network control protocol (NCP) session,
one or more instructions which, when executed by the processor, cause the processor to provide an indication when a layer one failure occurs on the communication interface, the layer one failure relating to a malfunction of the component,
one or more instructions which, when executed by the processor, cause the processor to perform, during a period of time, a switchover, which includes establishing another layer one session on another communication interface, in response to providing the indication, the communication interface differing from the other communication interface,
one or more instructions which, when executed by the processor, cause the processor to delay sending, for the period of time, an indication that the PPP session is down, and
one or more instructions which, when executed by the processor, cause the processor to attempt to establish, during the period of time, another PPP session on the other communication interface, the one or more instructions to attempt to establish the other PPP session including:

one or more instructions to attempt, during the period of time, to establish a second LCP session on the other communication interface, the second LCP session being different from the first LCP session; and one or more instructions to attempt, during the period of time and when the second LCP session has been established on the other communication interface, to transfer the NCP session from the communication interface to the other communication interface.

15. The non-transitory computer-readable medium of claim 14, further comprising:

one or more instructions to indicate that the PPP session is down when the other PPP session has not been established before the period of time expires.

16. The non-transitory computer-readable medium of claim 14, where the one or more instructions to delay sending the indication that the PPP session is down further include:

one or more instructions to enter a start state corresponding to a state 1 defined in a PPP specification.

17. A device, comprising:

a processor to:

establish a layer one session over an interface, the interface including a component to receive data, from a network, during the layer one session;

establish a Point-to-Point Protocol (PPP) session with respect to the layer one session over the interface, the PPP session being associated with a first link control protocol (LCP) session on the interface;

determine a failure of the layer one session on the interface, the failure relating to a malfunction of the component;

perform, during a period of time, a switchover to establish another layer one session over another interface in response to the failure of the layer one session;

delay, for the period of time, designating the PPP session as lost;

attempt to establish, during the period of time, another PPP session with respect to the other layer one session over the other interface, the other PPP session being associated with a second LCP session on the other interface;

attempt, when the second LCP has been established on the other interface, to move a network control protocol (NCP) session associated with the first LCP session to the other interface; and designate the PPP session as lost when the other PPP session is not established over the other interface before the period of time expires.

18. The device of claim 17, where the processor is further to:

omit designating a layer three session as lost, with respect to the PPP session, when the other PPP session is established over the other interface before the period of time expires.

19. The device of claim 17, where the processor, when determining a failure of the layer one session, is further to:

detect a This-Layer-Down (TLD)/1 event, where the TLD/1 event corresponds to the indication of the failure of the layer one session.

20. The device of claim 17, where the processor is further to:

determine that the period of time expires before the other PPP session on the other interface is established; and indicate that a layer three session is down on the interface, when the period of time has expired before the other PPP session on the other interface is established.

\* \* \* \* \*